US007367703B2

(12) United States Patent
Yagi et al.

(10) Patent No.: US 7,367,703 B2
(45) Date of Patent: May 6, 2008

(54) VEHICLE HEADLAMP AND LAMP UNIT

(75) Inventors: Takayuki Yagi, Shizuoka (JP); Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 55 days.

(21) Appl. No.: 11/197,351

(22) Filed: Aug. 5, 2005

(65) Prior Publication Data

US 2006/0028833 A1 Feb. 9, 2006

(30) Foreign Application Priority Data

Aug. 6, 2004 (JP) ........................ P. 2004-230660

(51) Int. Cl.
*B60Q 1/04* (2006.01)
*F21V 5/04* (2006.01)

(52) U.S. Cl. ...................................... 362/539; 362/522

(58) Field of Classification Search ................ 362/538, 362/539, 520, 522, 308, 328
See application file for complete search history.

(56) References Cited

U.S. PATENT DOCUMENTS 4,928,213 A * 5/1990 Nakata ...................... 362/539
5,036,438 A * 7/1991 Nakata ...................... 362/539
5,285,358 A * 2/1994 Watanabe et al. .......... 362/538
6,186,651 B1 * 2/2001 Sayers et al. .............. 362/512
6,439,745 B2 * 8/2002 Futami ...................... 362/297
6,742,918 B2 * 6/2004 Collins ...................... 362/509
2003/0107901 A1 * 6/2003 Tokoro et al. ............. 362/538

FOREIGN PATENT DOCUMENTS

JP 63-314701 A 12/1988

* cited by examiner

*Primary Examiner*—Jong-Suk (James) Lee
*Assistant Examiner*—Edmund C Kang
(74) *Attorney, Agent, or Firm*—Sughrue Mion, PLLC

(57) ABSTRACT

The projection lens of a lamp unit is configured as a plano-convex lens whose front surface is a convex curved surface and whose rear surface is a plane. The rear surface is constituted by a plane tilted upward with respect to a plane orthogonal to the optical axis and outward in a vehicle width direction.

13 Claims, 8 Drawing Sheets

VEHICLE HEADLAMP AND LAMP UNIT

The present application claims foreign priority based on Japanese Patent Application No. P.2004-230660, filed on Aug. 6, 2004, the contents of which are incorporated herein by reference.

BACKGROUND OF THE INVENTION

1. Field of the Invention

The present invention relates to a vehicle headlamp equipped with a so-called projector-type lamp unit.

2. Related Art

In general, a vehicle headlamp comprises a lamp room formed by a lamp body and a translucent cover attached to a front end opening of the lamp body, the lamp room accommodating a lamp unit having an optical axis extending in the longitudinal direction of a vehicle. Disclosed in JP-A-63-314701 is a projector-type lamp unit as one type of the lamp unit.

In the projector-type lamp unit, a projection lens is disposed on an optical axis of the projector-type lamp unit, and a light source is disposed behind a rear focus point of the projection lens. Light from the light source onto a reflector is reflected so as to direct to an area close to the optical axis. As the projection lens, a plano-convex lens is used. In the plano-convex lens, a front surface is a convex curved surface and a rear surface is a plane.

However, the projection lens has problems described below since a plane constituting its rear surface is orthogonal to an optical axis.

In general, a vehicle headlamp is arranged in the right and left corners of the front end of a vehicle, so that its translucent cover often has a surface profile tilted upward along a vehicle profile and outward in a vehicle width direction. A projection lens of the lamp unit is constituted by a plane whose rear surface is orthogonal to an optical axis thus it is impossible to arrange the projection lens along the translucent cover. This results in a larger depth dimension of a lamp room accommodating the lamp unit.

Another problem is that, when the lamp unit is observed through the translucent cover, only its projection lens appears in the front direction of the vehicle, which lacks a novel design of the headlamp.

SUMMARY OF THE INVENTION

In accordance with one or more embodiments of the present invention, a vehicle headlamp is capable of reducing the depth dimension of a lamp room as well as providing the light fixture design with a novelty.

In accordance with one or more embodiments of the present invention, a vehicle headlamp is provided with a lamp unit having an optical axis extending in a longitudinal direction of a vehicle. The lamp unit is provided with a projection lens arranged on the optical axis; a light source arranged behind a rear focus point of the projection lens; and a reflector that reflects light from the light source in forward direction close to the optical axis. The projection lens is configured as a plano-convex lens having a convex curved front surface and a plane rear surface. A plane of the plane rear surface is tilted upward with respect to a plane orthogonal to the optical axis and outward in a vehicle width direction.

In accordance with one or more embodiments of the present invention, the vehicle headlamp is further provided with a lamp room formed by a lamp body and a translucent cover attached to the front end opening of the lamp body. The lamp unit is accommodated in the lamp room.

In accordance with one or more embodiments of the present invention, the translucent cover has a surface profile tilted upward along the vehicle profile and outward in the vehicle width direction.

In accordance with one or more embodiments of the present invention, the convex curved front surface comprises an aspherical surface, and the rear focus point is positioned on the optical axis.

In accordance with one or more embodiments of the present invention, the lamp unit is further provided with a shade for shielding part of the reflected light from a reflector. An upper end edge of the shade is positioned near the optical axis in the vicinity of the rear focus point.

In accordance with one or more embodiments of the present invention, an upward angle between the plane of the plane rear surface with respect to the plane orthogonal to the optical axis is set to a value equal to or more than 15 degrees.

In accordance with one or more embodiments of the present invention, an outward angle of the plane of the plane rear surface in the vehicle width direction is set to a value equal to or more than 15 degrees.

The type of the “light source” is not particularly limited. For example, a discharge light-emitter of a discharge bulb, a filament of a halogen lamp, or a light-emitting chip such as a light-emitting diode may be used.

The “convex curved surface” of the front surface may be spherical or aspherical, in accordance with one or more embodiments of the present invention.

That the plane constituting the plane rear surface of the projection lens “is tilted upward with respect to a plane orthogonal to the optical axis and outward in a vehicle width direction” means that the vertical cross section profile of the plane constituting the rear surface of the projection lens is constituted by a straight line extending while being displaced toward the rear side from its bottom end edge to the upper end edge and that the horizontal cross section profile of the plane constituting the rear surface of the projection lens is constituted by a straight line extending while being displaced toward the rear side from its inner end edge in a vehicle width direction to the outer end edge in a vehicle width direction.

A specific value of the upward angle or outward angle in a vehicle width direction is not particularly limited, in accordance with one or more embodiments of the present invention.

In accordance with one or more embodiments of the present invention, a vehicle headlamp is provided with a lamp room formed by a lamp body and a translucent cover attached to the front end opening of the lamp body, the lamp room accommodating a lamp unit. The projection lens of the lamp unit is configured as a plano-convex lens whose front surface is a convex curved surface and whose rear surface is a plane and the plane constituting the rear surface of the projection lens is tilted upward with respect to a plane orthogonal to an optical axis extending in the longitudinal direction of a vehicle and tilted outward in a vehicle width direction. Thus, in case the translucent cover has a surface profile tilted upward along the vehicle profile and outward in a vehicle width direction, it is possible to arrange the projection lens along the translucent cover.

As a result, it is possible to reduce the depth dimension of the lamp room accommodating the lamp unit. When the lamp unit is observed through the translucent cover, the projection lens tilted in two directions appears as arranged along the surface profile of the translucent cover, which gives a novelty to the lighting fixture design.

Moreover, it is possible to reduce the depth dimension of a lamp room and give a novelty to the lighting fixture design.

In accordance with one or more embodiments of the present invention, the convex curved surface constituting the front surface of the projection lens may be a spherical surface. In case the convex curved surface is an aspherical surface formed so as to position the rear focus point of the projection lens on the optical axis, aberration of the projection lens is removed. This allows accurate radiation control of light irradiated forward from the lamp unit.

A configuration is possible where the lamp unit is arranged in order for the upper end to be positioned near the optical axis in the vicinity of the rear focus point of the projection lens and the lamp unit is equipped with a shade for shielding part of the reflected light from a reflector. This configuration forms a light distribution pattern having a cutoff line at its upper end. In this practice, using the aspherical surface as the convex curved surface constituting the front surface of the projection lens can form a crisp cutoff line.

As mentioned above, the upward angle or outward angle in vehicle width direction of the plane constituting the rear surface of the projection lens is not particularly limited. In case each of the upward angle and the outward angle is set to a value equal to or more than 15 degrees, it is possible to give considerable novelty to the lamp unit design. In case each of the upward angle and the outward angle is set to a value equal to or more than 20 degrees, it is possible to give further novelty to the lamp unit design.

Other aspects and advantages of the invention will be apparent from the following description and the appended claims.

DESCRIPTION OF THE PREFERRED EMBODIMENTS

Embodiments of the invention will be described referring to drawings.

Figure 1:
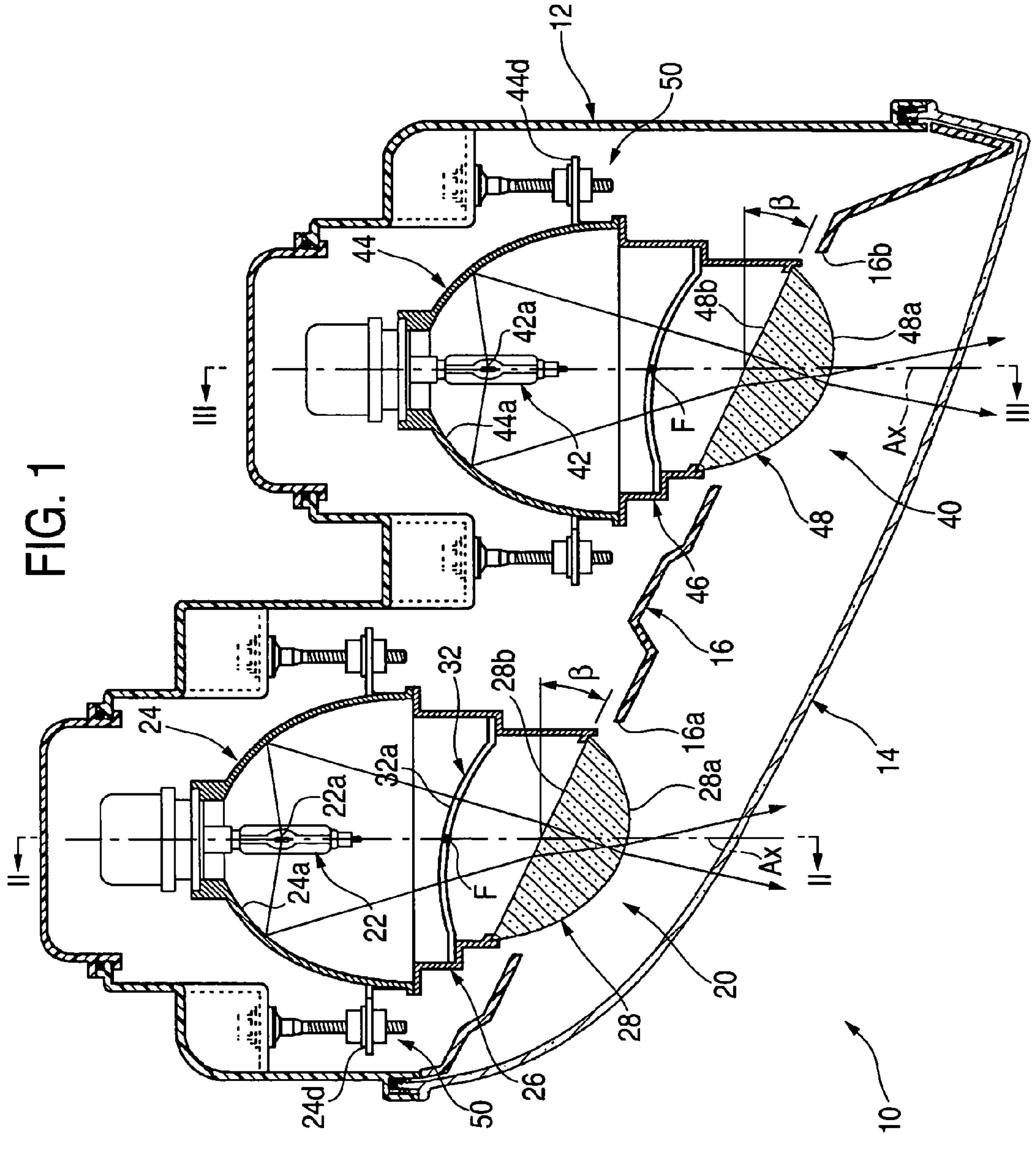
FIG. 1 is a horizontal cross section of a vehicle headlamp.
Figure 2:
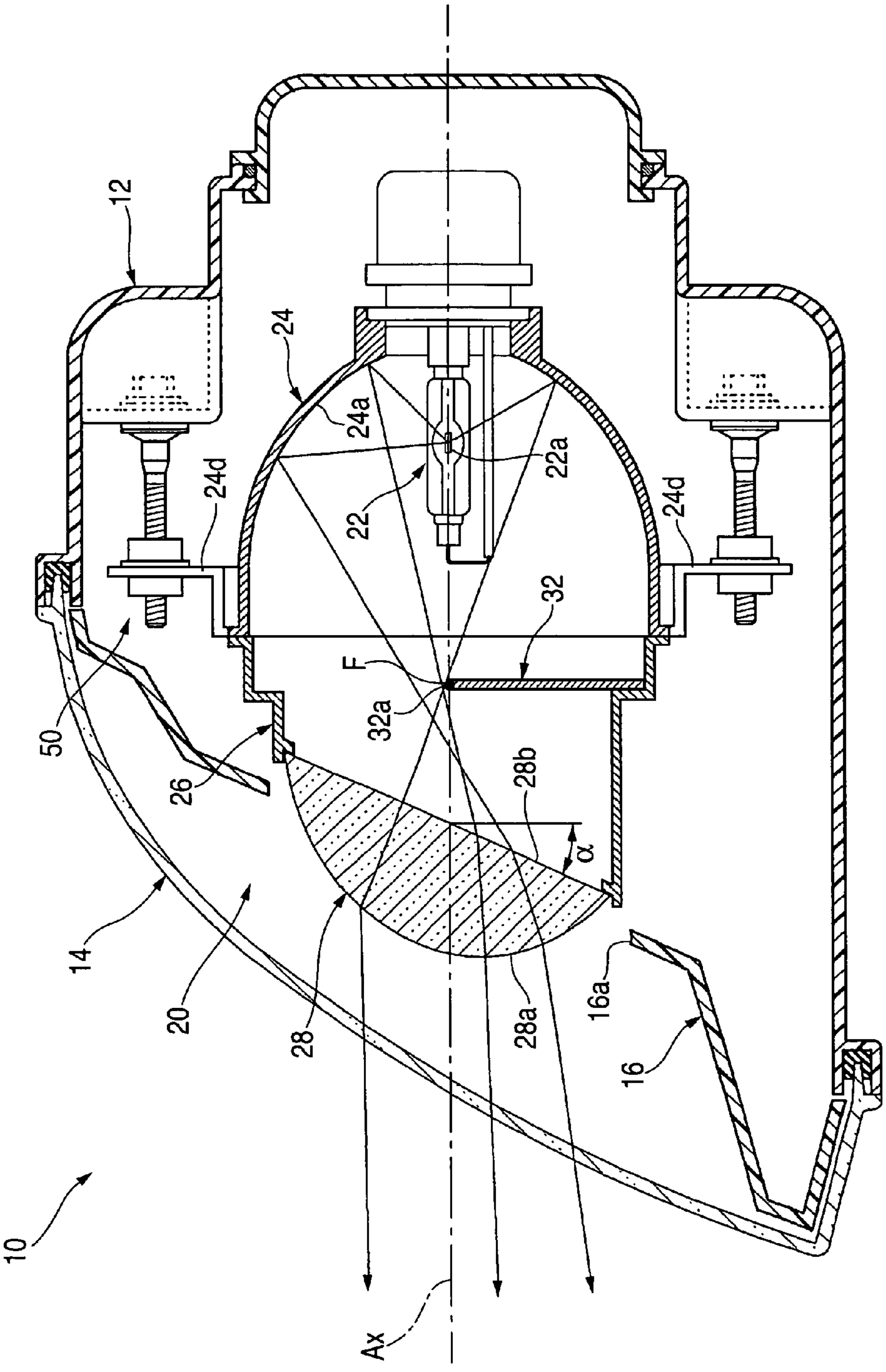
FIG. 2 is a cross section of a II-II line of the vehicle headlamp shown in FIG. 1.
Figure 3:
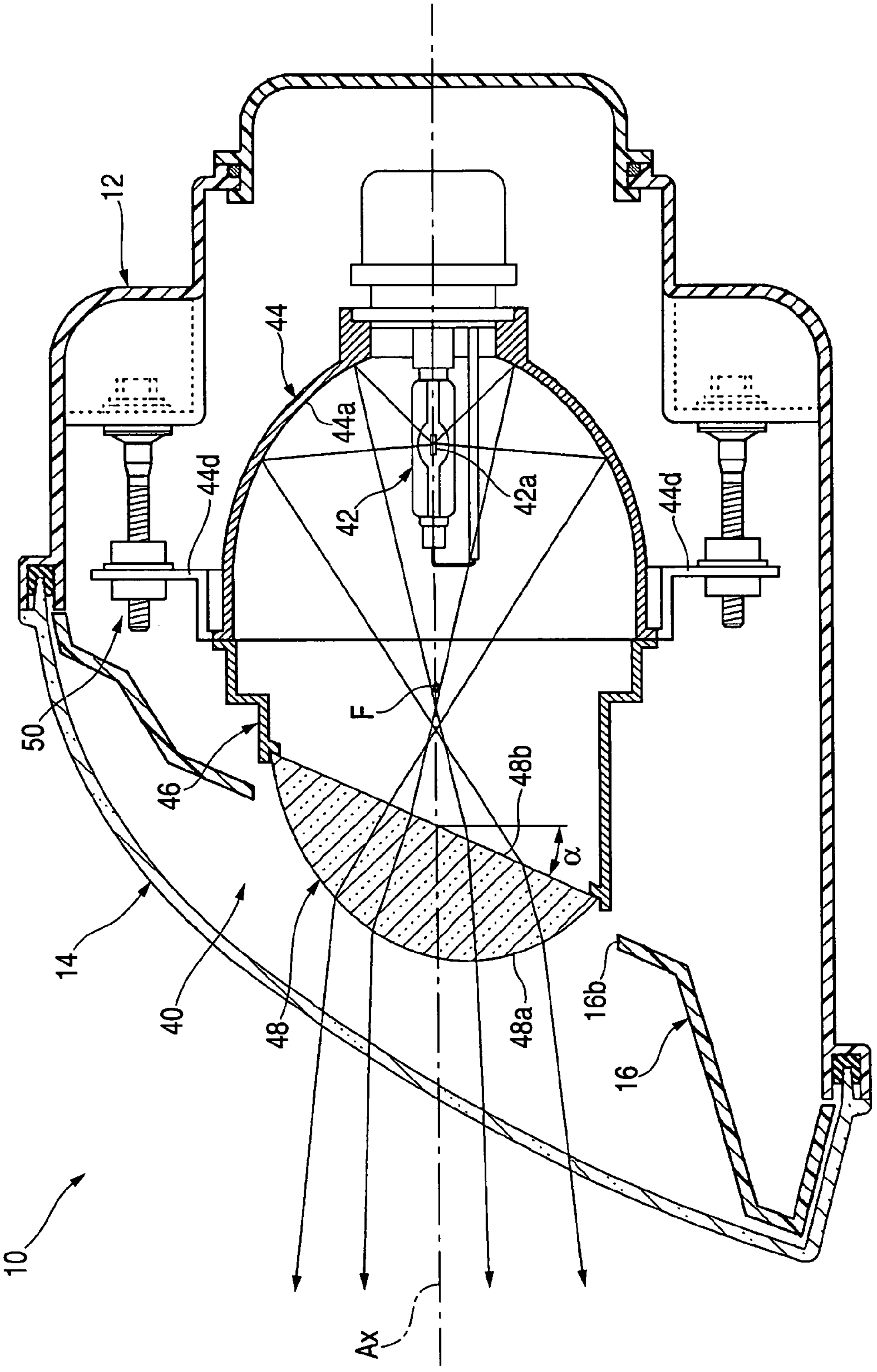
FIG. 3 is a cross section of a III-III line of the vehicle headlamp shown in FIG. 1.

FIG. 1 is a horizontal cross section of a vehicle headlamp 10 according to an embodiment of the invention. FIGS. 2 and 3 are respectively a cross section of a II-II line and a cross section of a III-III line of the vehicle headlamp 10.

As shown in the figures, the vehicle headlamp 10 is a light fixture arranged at a front right section of a vehicle where two lamp units 20, 40 are adjacently accommodated in vehicle width direction in a lamp room formed by a lamp body 12 and a see-through translucent cover 14 attached to the front end opening of the lamp body. The vehicle headlamp 10 forms a low beam light distribution pattern by way of lighting of the lamp unit 20 as well as a high beam light distribution pattern by way of simultaneous lighting of the lamp units 20 and 40.

The two lamp units 20, 40 each has an optical axis Ax extending in the longitudinal direction of a vehicle and is supported tiltably by the lamp body 12 in vertical direction and lateral direction via an aiming mechanism 50. Once aiming adjustment is made by the aiming mechanism 50, the optical axis Ax of the lamp unit 20 extends in a direction 0.5 to 0.6 degrees downward with respect to the longitudinal direction of a vehicle, while the optical axis Ax of the lamp unit 40 extends in the longitudinal direction of a vehicle.

The translucent cover 14 is designed to go around rearward along the car body of the right corner of the vehicle front end, from inside in vehicle width direction to outside in vehicle direction and from its bottom end edge to its upper end edge. Thus, the two lamp units 20, 40 are arranged so that the lamp unit 20 positioned outside in vehicle width direction will be dislocated rearward to some extent with respect to the lamp unit 40 positioned inside in vehicle width direction.

In the lamp room, an extension panel 16 along the translucent cover 14 is provided. The extension panel 16 is formed with openings 16*a*, 16*b* surrounding the lamp units 20, 40 in the vicinity of its front end.

The configuration of each of the lamp units 20, 40 will be described.

First, the configuration of the lamp unit 20 is described below.

Figure 4:
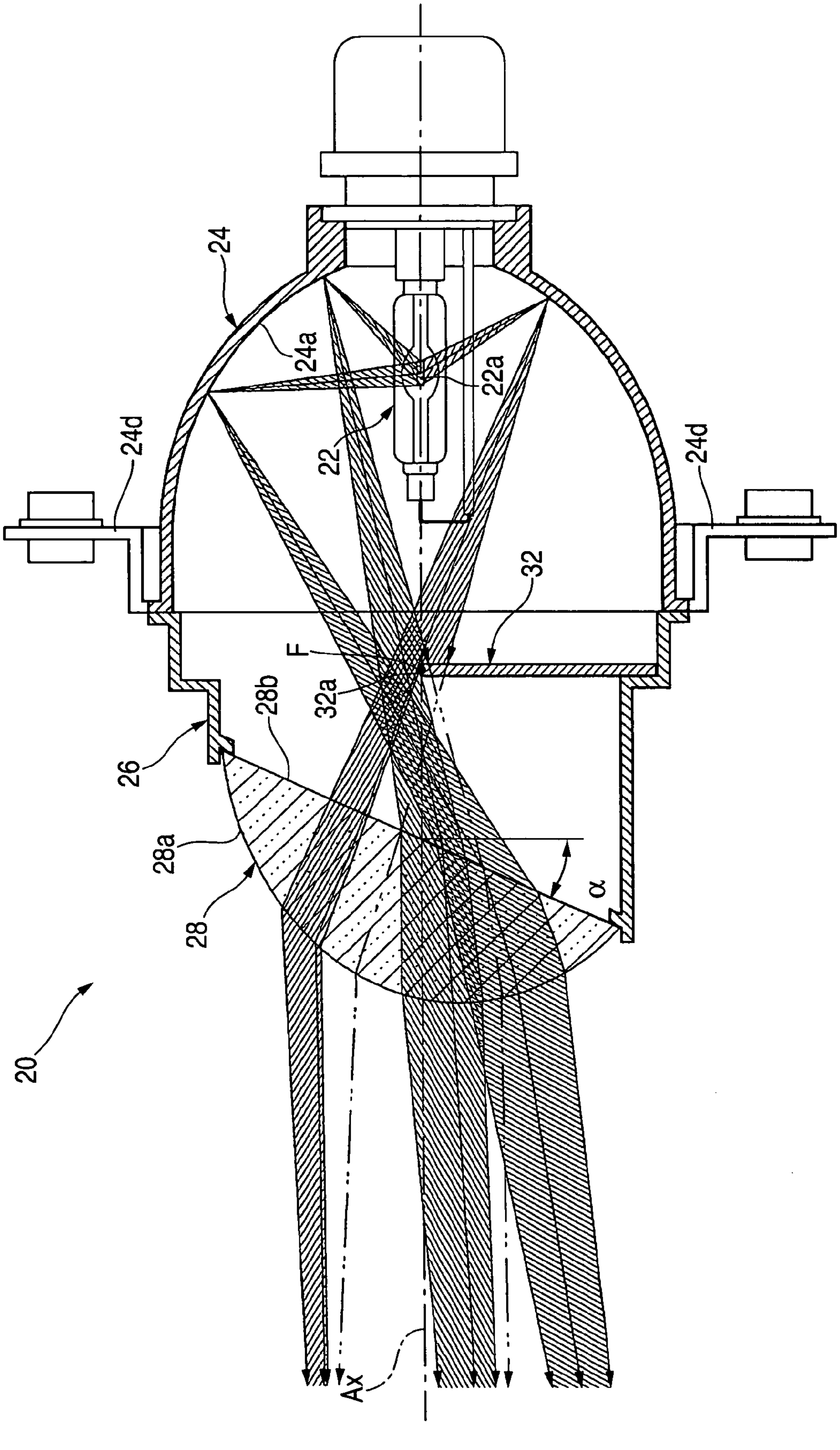
FIG. 4 is a side cross section of a lamp unit shown in FIG. 2 as a standalone unit.
Figure 5:
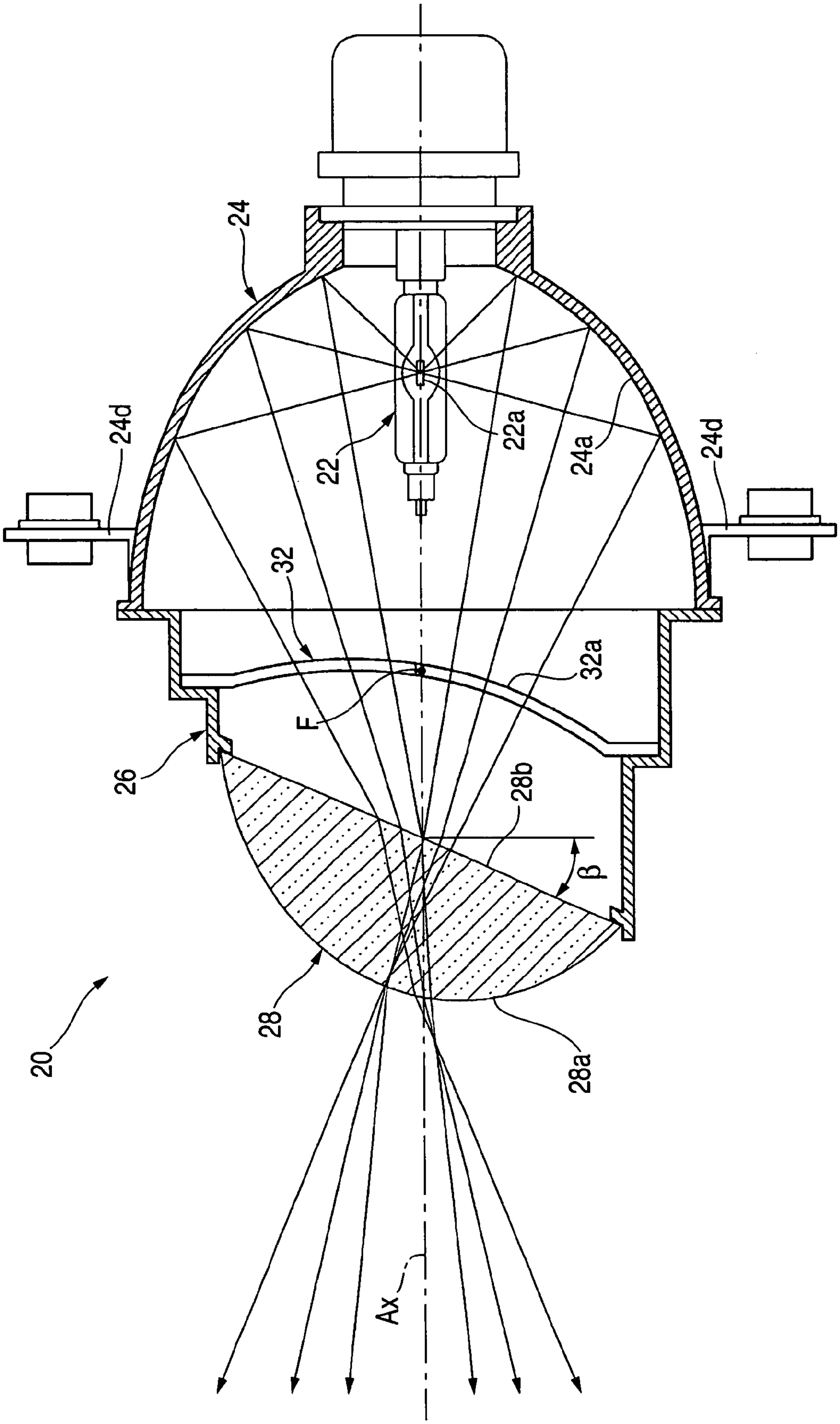
FIG. 5 is a horizontal cross section of the lamp unit shown in FIG. 2 as a standalone unit.
Figure 6:
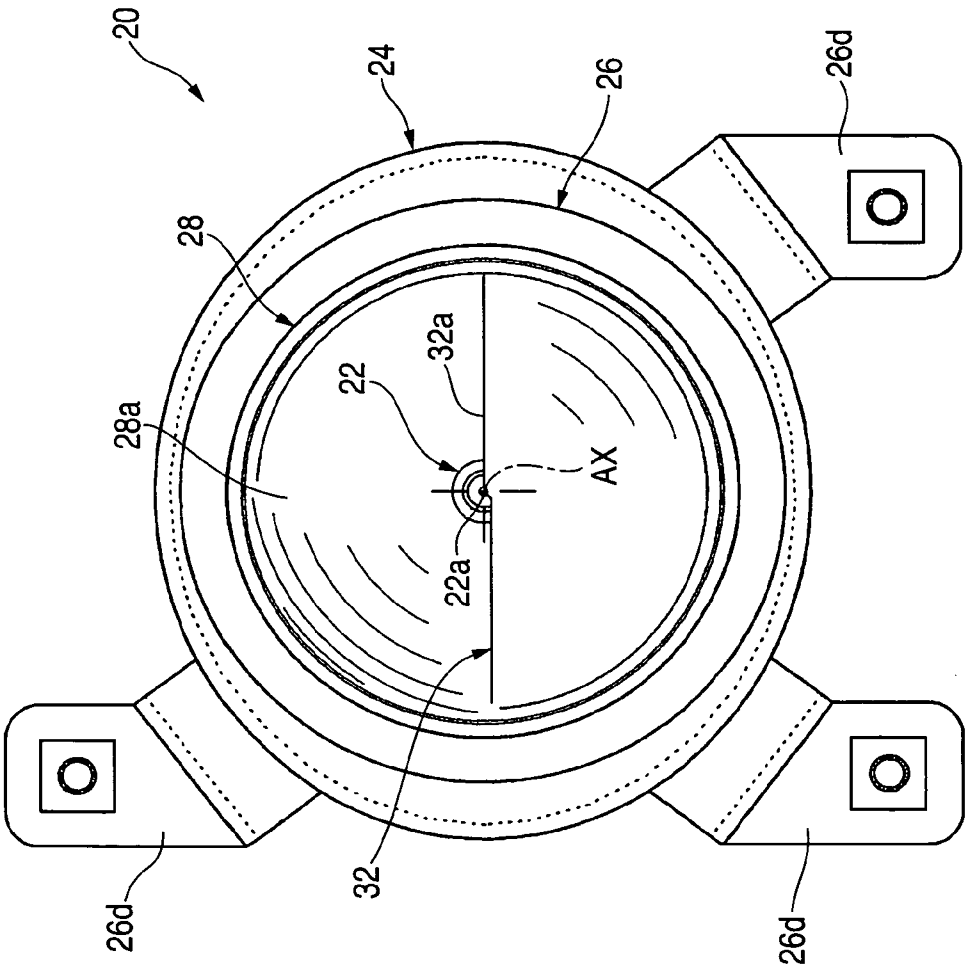
FIG. 6 is a front view of the lamp unit shown in FIG. 2 as a standalone unit.
Figure 7:
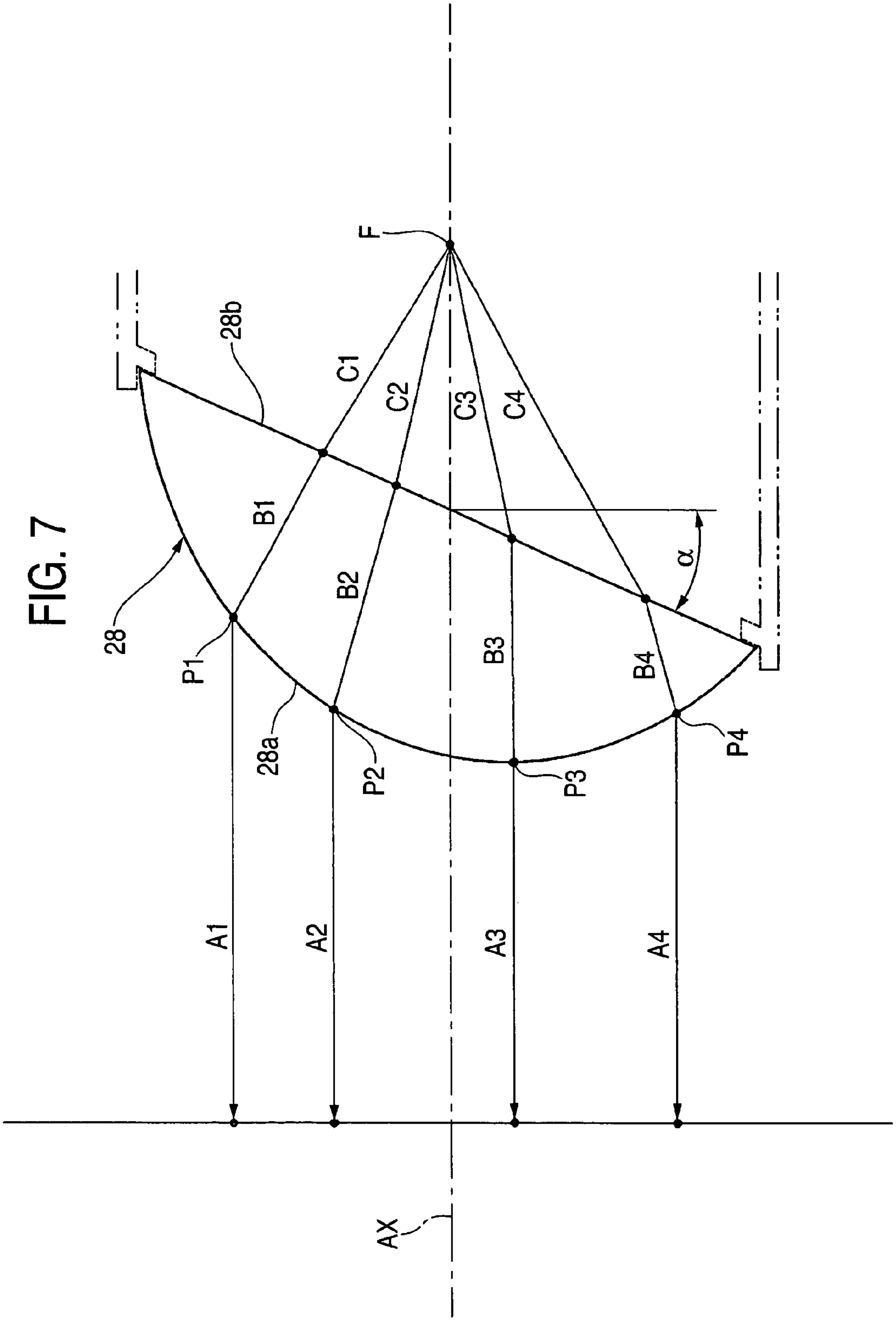
FIG. 7 illustrates the vertical cross section profile of the projection lens of the lamp unit shown in FIG. 2.

FIGS. 4, 5 and 6 are a side cross section, a horizontal cross section and a front view of the lamp unit 20 as a standalone unit, respectively.

As shown in these figures, the lamp unit 20 is a projector-type lamp unit and provided with a light source bulb 22, a reflector 24, a lens holder 26, a projection lens 28 and a shade 32.

The projection lens 28 configured as a plano-convex lens whose front surface 28*a* is a convex curved surface and whose rear surface 28*b* is a plane is arranged on the optical axis Ax. That is, the projection lens 28 includes a convex curved front surface 28*a* and a plane rear surface 28*b*. The projection lens 28 is designed to project an image on a focal plane including the rear focus point of the projection lens 28 in forward direction as an inverted image.

A plane constituting the rear surface 28*b* of the projection lens 28 is tilted upward with respect to a plane orthogonal to the optical axis Ax and outward in a vehicle width direction. The upward angle $\alpha$ and the outward angle $\beta$ each is set to a value equal to or more than 15 degrees (to be more precise, $\alpha$=25 degrees and $\beta$=25 degrees).

The convex curved surface constituting the front surface 28*a* of the projection lens 28 is an aspherical surface formed to position the rear focus point F of the projection lens on the optical axis Ax. That is, the convex curved surface constituting the front surface 28*a* has its aspherical profile set as an envelope of points Pi (i=1, 2, 3 . . . ) where the optical path length Ai+nBi+Ci (i=1, 2, 3 . . . ) from the rear focus point F set on the optical axis Ax to a plane orthogonal to the optical axis arranged in front of the projection lens 28 is constant. Note that n in the expression of the optical path length is the refractive index of the projection lens 28.

The light source bulb 22 is a discharge bulb such as a metal halide bulb whose discharge emitter is a light source 22*a*. The light source 22*a* is constituted as a line segment light source extending in the center axis of the bulb. The light bulb 22 is inserted and fixed from behind to the rear top opening of the reflector 24 so that the light source 22 will be positioned on the optical axis Ax behind the rear focus point F of the projection lens 28.

The reflector 24 has a reflection surface 24*a* that reflects light from the light source 22*a* in forward direction toward an area close to the optical axis Ax. The reflection surface 24*a* has a substantially elliptical cross section. The eccentricity of the reflection surface 24*a* is designed to gradually increase from the vertical cross section to the horizontal cross section. Thus, the light from the light source 22 reflected onto the reflection surface 24*a* is almost converged in the vicinity of the rear focus point F in the vertical cross section while the convergence position of the light is shifted substantially forward in the horizontal cross section.

The reflector 24 is supported by the lamp body 12 via an aiming mechanism 50 at aiming brackets 24*d* formed on three sections of the reflector 24.

The shade 32 is fixedly supported by a lens holder 26 while positioned in an approximately lower section of the internal space of the lens holder 26. The shade 32 is formed so that its upper end edge 32*a* will pass through the rear focus point F of the projection lens 28. This shields part of reflected light from the reflection surface 24*a* of the reflector 24 to remove most of the upward light irradiated forward from the projection lens 28. The upper end edge 32*a* of the shade 32 extends along the rear focal plane of the projection lens 28 in horizontal direction in an approximately arcuate profile and has a stepped difference in lateral direction.

The lens holder 26 is formed so as to extend forward, in the profile of an approximate stepped/tapered cylinder, from the front end opening of the reflector 24. The lens holder 26 is fixedly supported by the reflector 24 at its rear end and fixedly supports the projection lens 28 at its front end.

Next, the configuration of the lamp unit 40 is described below.

As shown in FIGS. 1 and 3, similarly to the lamp unit 20, the lamp unit 40 is a projector-type lamp unit comprising a light source bulb 42, a reflector 44, a lens holder 46, and a projection lens 48.

Unlike the lamp unit 20, the lamp unit 40 does not have a shade 32. The remaining configuration of the lamp unit 40 is almost the same as that of the lamp unit 20. Note that the reflector 44 of the lamp unit 40 has a reflection surface 44*a* set so as to bring the convergence position of the light from the light source 42*a* closer to the rear focus point F of the projection lens 48 than the reflector 24 of the lamp unit 20.

The lamp unit 40 is also supported by the lamp body 12 via the aiming mechanism 50 at aiming brackets 44*d* formed on three sections of the reflector 44.

Figure 8A:
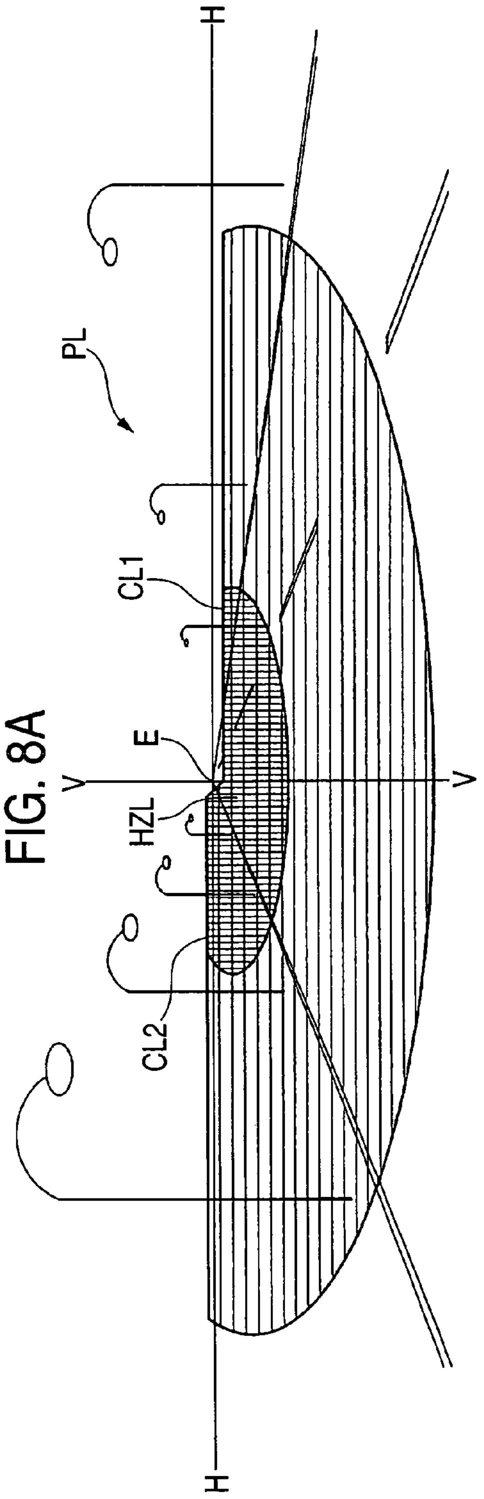
FIG. 8A is a perspective view of a low beam light distribution pattern formed on a virtual vertical screen arranged at a position 25 meters ahead of the lamp unit by the light irradiated forward from the vehicle headlamp.
Figure 8B:
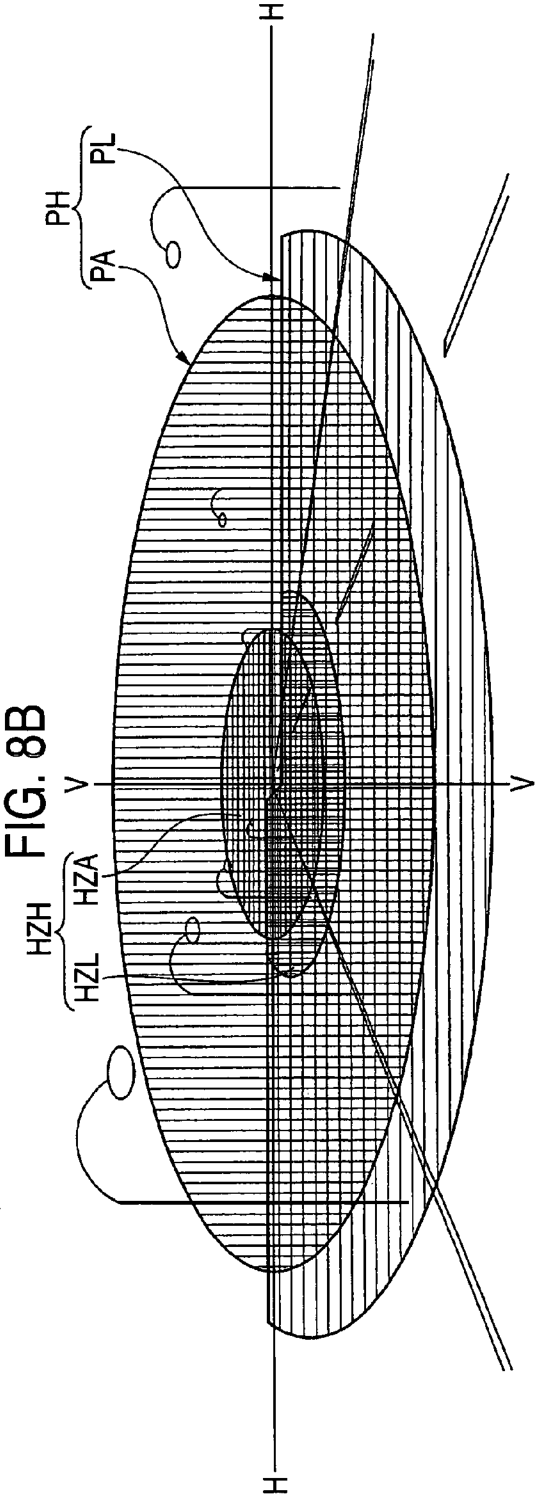
FIG. 8B is a perspective view of a low beam light distribution pattern formed on a virtual vertical screen arranged at a position 25 meters ahead of the lamp unit by the light irradiated forward from the vehicle headlamp.

FIGS. 8A and 8B are perspective views of light distribution patterns formed on a virtual vertical screen arranged at a position 25 meters ahead of the lamp unit by the light irradiated forward from the vehicle headlamp 10. FIG. 8A shows a low beam light distribution pattern formed by way of lighting of the lamp unit 20. FIG. 8B shows a high beam light distribution pattern formed by way of simultaneous lighting of the lamp units 20 and 40.

As shown in FIG. 8A, the low beam light distribution pattern PL is a left side light distribution pattern that has cutoff lines CL1, CL2 with a stepped difference. The cutoff lines CL1, CL2 extends, with a stepped difference, in horizontal direction, about a V-V line passing through H-V as an erase point in the front direction of the lamp unit. The oncoming lane section on the right side of the V-V line is formed as the lower cutoff line CL1, while the own lane section on the left side of the V-V line is formed as the upper cutoff line CL2 stepped up via a tilted section from the cutoff line CL1. In the low beam light distribution pattern PL, the position of an elbow point E as the intersection of the lower cutoff line CL1 and the V-V line is set some 0.5 to 0.6 degrees below H-V. A hot zone HZL as a high intensity area is formed to surround the elbow point E.

The low beam light distribution pattern PL is formed by irradiation of light from the lamp unit 20. To be more precise, the low beam light distribution pattern PL is formed by projecting, as an inverted projection image, by way of reflected light from the reflection surface 24*a* of the reflector 24, the image of the light source 22*a* formed on the rear focal plane of the projection lens 22 onto the virtual vertical screen. The cutoff lines CL1, CL2 are formed as inverted projection images of the upper end edge 32*a* of the shade 32.

As shown in FIG. 8B, the high beam light distribution pattern PH is configured as a synthetic light distribution pattern of the low beam light distribution pattern PL and an additional light distribution pattern PA formed by irradiation of light from the lamp unit 40.

The additional light distribution pattern PA is a horizontally oriented light distribution pattern extending rightward and leftward about H-V. The overall diffusion angle of the additional light distribution pattern PA is slightly smaller than that of the low beam light distribution pattern PL. The hot zone HZA of the additional light distribution pattern PA on H-V is substantially brighter than that of the low beam light distribution pattern PL. This is because the convergence position of reflected light from the reflector 44 of the lamp unit 40 is closer to the rear focus point F of the projection lens 48 than the case of the lamp unit 20.

In the high beam light distribution pattern PH, the low beam light distribution pattern PL is synthesized with the additional light distribution pattern PA so as to irradiate light up to the upper area of the cutoff line CL1, CL2, thereby forming a bright hot zone HZH by way of overlaying of hot zones HZL and HZA in the vicinity of H-V.

As detailed above, the vehicle headlamp 10 according to the embodiment comprises the lamp room formed by a lamp body 12 and the translucent cover 14, the lamp room accommodating two projector-type lamp units 20, 40. The projection lens 28, 40 of the lamp unit 20, 40 is configured as a plano-convex lens whose front surface 28*a*, 48*a* is a convex curved surface and whose rear surface 28*b*, 48*b* is a plane and the plane constituting the rear surface 28*b*, 48*b* of the projection lens is tilted upward with respect to a plane orthogonal to the optical axis Ax extending in the longitudinal direction of a vehicle and tilted outward in a vehicle width direction. Thus, although the translucent cover 14 has a surface profile tilted upward along the vehicle profile and outward in a vehicle width direction, it is possible to arrange the projection lens 28, 40 along the translucent cover 14.

As a result, it is possible to reduce the depth dimension of the lamp room accommodating the two lamp units 20, 40. When the lamp unit 20, 40 is observed through the translucent cover 14, the projection lens tilted in two directions appears as arranged along the surface profile of the translucent cover 14, which gives a novelty to the lighting fixture design.

With the vehicle headlamp 10 equipped with the projector-type lamp unit 20, 40 according to the embodiment, it is possible to reduce the depth dimension of the lamp room and give a novelty to the lighting fixture design.

In particular, according to this embodiment, the convex curved surface constituting the front surface 28*a*, 48*a* of the projection lens 28, 48 is an aspherical surface formed to position the rear focus point F of the projection lens 28, 48 on the optical axis Ax. This removes aberration of the projection lens 28, 48, thereby performing accurate radiation control of light irradiated forward from the lamp unit 20, 40.

The lamp unit 20 has a shade 32 for shielding part of the reflected light from a reflector 24 and its upper end edge 32*a* is positioned on the optical axis at the rear focus point F of the projection lens 28. It is thus possible to form, by way of irradiation of light from the lamp unit 20, a low beam light distribution pattern PL having the cutoff lines CL1, CL2 at its upper end. The convex curved surface constituting the front surface 28*a* of the projection lens 28 is aspherical so that it can form the cutoff line CL1, CL2 as a crisp cutoff line.

In this embodiment, each of the upward angle α and the outward angle β in a vehicle width direction of a plane constituting the rear surface 28*b*, 48*b* of the projection lens 28, 48 is set to a substantially large value, that is, α=25 degrees and β=25 degrees. This ensures the novelty of the lamp unit design.

While two lamp units 20, 40 are accommodated in the lamp room of the vehicle headlamp 10 according to the embodiment, a configuration where either the lamp unit 20 or lamp unit 40 alone is accommodated in the lamp room obtains the same operation/working-effect as the above embodiment.

While the upward angle α and the outward angle β in a vehicle width direction of a plane constituting the rear surface 28*b*, 48*b* of the projection lens 28, 48 are set to a same value, these values may be set to different values. While the upward angle α and the outward angle β in a vehicle width direction are se to 25 degrees, a value other than 25 degrees, as long as it is 15 degrees or more, obtains almost the same operation/working-effect as the above embodiment.

While the vehicle headlamp 10 arranged at the front right end of a vehicle has been described in the above embodiment, a vehicle headlamp arranged at the front left end of a vehicle obtains the same operation/working-effect as the above embodiment by employing the same configuration as the above embodiment.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a lamp unit having an optical axis extending in a longitudinal direction of a vehicle, the lamp unit including:

a projection lens arranged on the optical axis;

a light source arranged behind a rear focus point of the projection lens; and a reflector that reflects light from the light source in forward direction close to the optical axis, wherein the projection lens comprises a plano-convex lens having a convex curved front surface and a plane rear surface, and a plane of the plane rear surface is tilted upward with respect to a plane orthogonal to the optical axis and outward in a vehicle width direction;

wherein a rear side of the projection lens is substantially planar; and wherein the plane of the plane rear surface comprises substantially an entire rear side of the projection lens.

2. The vehicle headlamp according to claim 1, further comprising:

a lamp room formed by a lamp body and a translucent cover attached to the front end opening of the lamp body, wherein the lamp unit is accommodated in the lamp room.

3. The vehicle headlamp according to claim 2, wherein the translucent cover has a surface profile tilted upward along a vehicle profile and outward in the vehicle width direction.

4. The vehicle headlamp according to claim 1, wherein the convex curved front surface comprises an aspherical surface, and the rear focus point is positioned on the optical axis.

5. The vehicle headlamp according to claim 1, wherein the lamp unit further includes:

a shade for shielding part of the reflected light from the reflector, wherein an upper end edge of the shade is positioned near the optical axis in the vicinity of the rear focus point.

6. The vehicle headlamp according to claim 1, wherein an upward angle between the plane of the plane rear surface with respect to the plane orthogonal to the optical axis is set to a value equal to or more than 15 degrees.

7. The vehicle headlamp according to claim 6, wherein an outward angle of the plane of the plane rear surface in the vehicle width direction is set to a value equal to or more than 15 degrees.

8. The vehicle headlamp according to claim 1, wherein an outward angle of the plane of the plane rear surface in the vehicle width direction is set to a value equal to or more than 15 degrees.

9. The vehicle headlamp according to claim 1, wherein the rear side of the projection lens consists essentially of the plane.

10. The vehicle headlamp according to claim 9, wherein the rear side of the projection lens consists of the plane.

11. A lamp unit having an optical axis extending in a longitudinal direction of a vehicle, the lamp unit including:

a projection lens arranged on the optical axis;

a light source arranged behind a rear focus point of the projection lens; and a reflector that reflects light from the light source in forward direction close to the optical axis, wherein the projection lens comprises a plano-convex lens having a convex curved front surface and a plane rear surface, and a plane of the plane rear surface is tilted upward with respect to a plane orthogonal to the optical axis and outward in a vehicle width direction;

wherein a rear side of the projection lens is substantially planar; and wherein the plane of the plane rear surface comprises substantially an entire rear side of the projection lens.

12. The lamp unit according to claim 11, wherein a rear side of the projection lens consists essentially of the plane.

13. The lamp unit according to claim 12, wherein the rear side of the projection lens consists of the plane.

* * * * *